Figure 1:
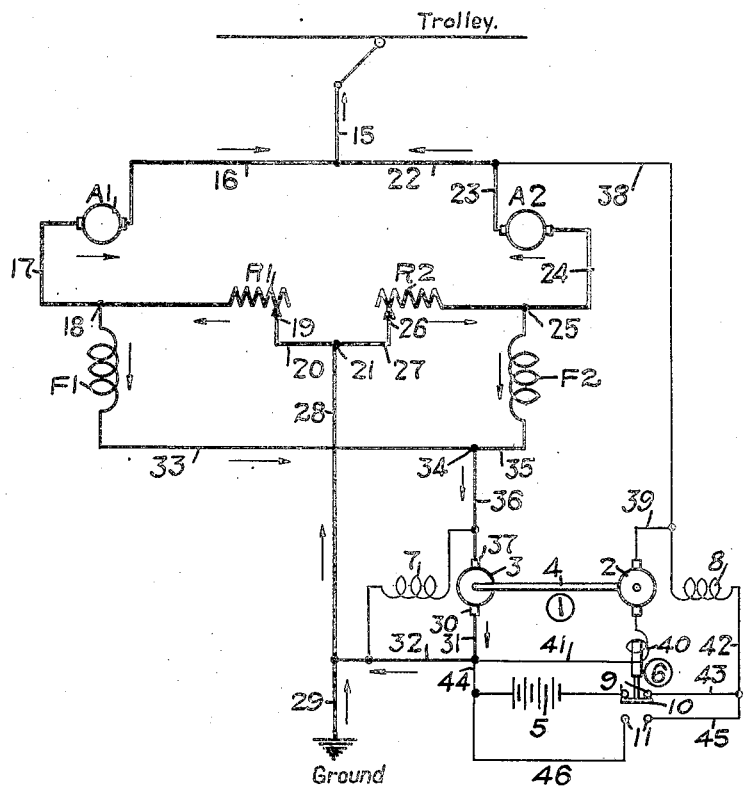

R. E. HELLMUND.
SYSTEM OF CONTROL.
APPLICATION FILED SEPT. 9, 1916.

1,284,330.

Patented Nov. 12, 1918.
2 SHEETS—SHEET 1.

WITNESSES:

INVENTOR
Rudolf E. Hellmund.
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,284,330.　　　　Specification of Letters Patent.　　Patented Nov. 12, 1918.

Application filed September 9, 1916. Serial No. 119,267.

*To all whom it may concern:*

Be it known that I, RUDOLF E. HELLMUND, a subject of the German Emperor, and a resident of Swissvale, in the county of Allegheny and State of Pennsylvania, have invented a new and useful Improvement in Systems of Control, of which the following is a specification.

My invention relates to systems of control for dynamo-electric machines and especially to the regenerative control of electric railway vehicle motors and the like.

In my co-pending application, Serial No. 44,443 filed August 9, 1915, is shown a regenerative control system of the above-indicated character wherein an auxiliary source of energy, such as a dynamotor or motor-generator set, is employed for exciting the field windings of the main momentum-driven machines, the arrangement of parts being such that an inherent and automatic decrease of regenerated voltage is effected upon an incipient increase of the main current, and vice versa, whereby a desirable negative compounding effect is provided and a relatively stable system of regeneration obtains.

However, under certain emergency conditions, such as the interruption of supply-circuit voltage by reason of the trolley leaving the supply-circuit conductor or passing a section break, it has ben found that, by reason of the decrease in current, the regenerated voltage instantaneously rises to a relatively high value because of the above-mentioned inherent regulating features of the system. Inasmuch as the exciting dynamotor or motor-generator set is connected in parallel relation to the main machines, it follows that such rise of voltage tends to effect an increase in the speed of the auxiliary machines which, in turn, causes an increase of the main field-winding excitation and the regenerated voltage, and thus the cycle continues until "flash-over" conditions are obtained in the motor of the motor-generator set or in the dynamotor in the course of a second or so.

The object of my present invention is to provide a relatively simple and effective means for obviating the above-mentioned difficulties, whereby the speed of the auxiliary dynamotor or motor-generator set is automatically varied oppositely to variations of the regenerated voltage.

More specifically stated, it is the object of my invention to provide, in a system of the class under consideration, a counter-electromotive force battery that is associated with a shunt-excited field winding for the auxiliary driving motor armature to produce a greater rate of current increase in the field winding than in the armature under the above-mentioned emergency conditions, whereby the speed of the auxiliary dynamotor is reduced to a predetermined degree and, consequently, the voltage of the auxiliary exciting armature is correspondingly decreased to thus reduce the main field-winding excitation and prevent the above-mentioned "flash-over" conditions.

Figure 2:
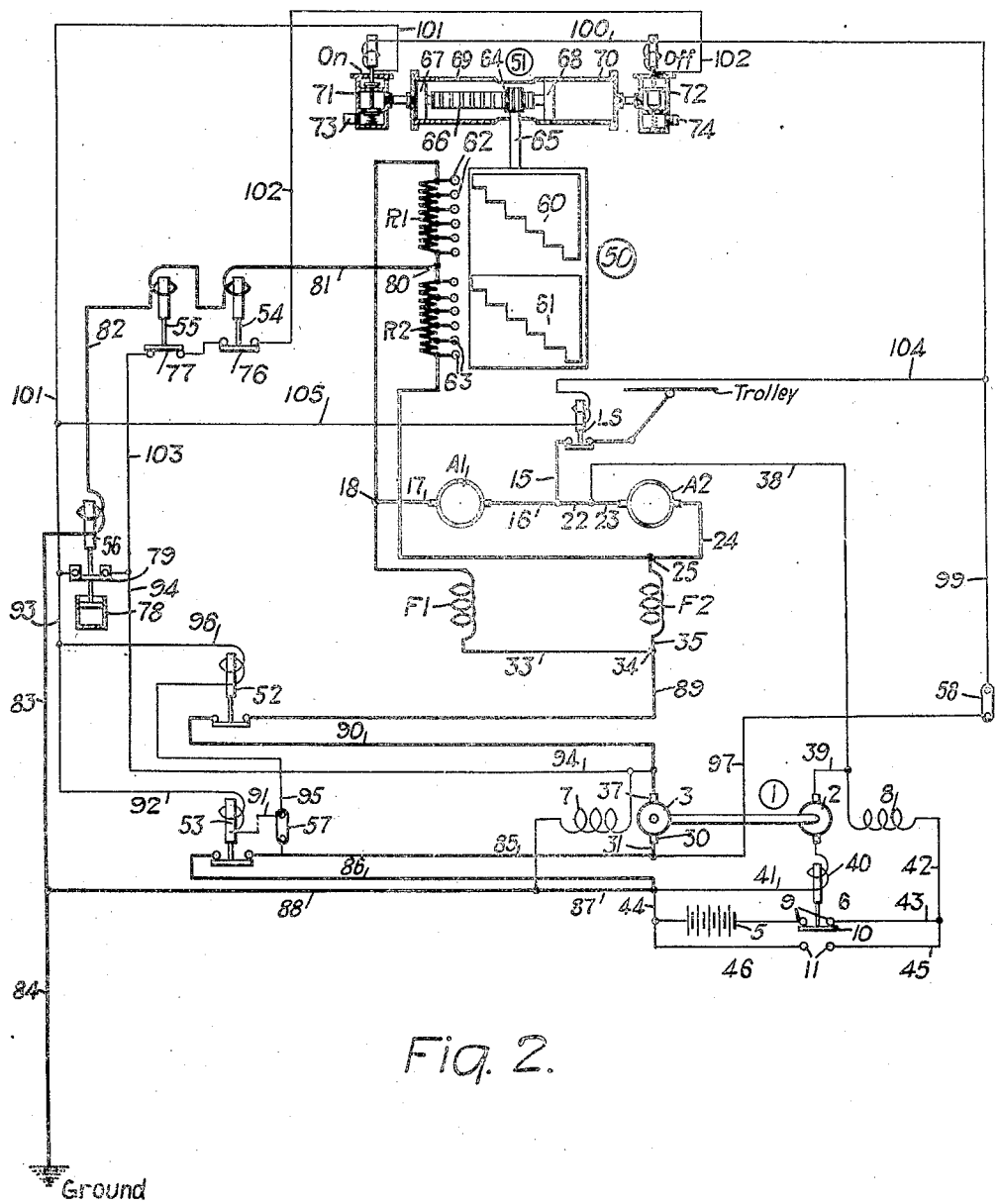

My invention may best be understood by reference to the accompanying drawing, wherein Figure 1 is a simplified diagrammatic view of a system of control embodying my invention; and Fig. 2 is a more detailed diagrammatic view of the system.

The system illustrated in Fig. 1 comprises a plurality of suitable supply-circuit conductors respectively marked "Trolley" and "Ground"; a plurality of main dynamo-electric machines respectively having armatures $A^1$ and $A^2$ and field windings $F^1$ and $F^2$ of the series type; a plurality of variable main-circuit resistors $R^1$ and $R^2$ which are connected in series with the respective main armatures, as set forth in detail later; an auxiliary dynamotor or motor-generator set 1 embodying a pair of armature windings 2 and 3 which may be mechanically connected in any convenient manner, as by a shaft 4; a counter-electromotive force battery 5, for a purpose to be described; and a relay device 6 that is associated with the auxiliary armature winding 2 and the counter-electromotive force battery 5, as subsequently set forth in detail.

A shunt-excited field winding 7 is provided for the auxiliary generating armature 3, and a shunt-excited field winding 8 is also provided for the other or driving motor armature 2 and is connected through the coöperating stationary and movable contact members 9 and 10, respectively, of the relay device 6 to the counter-electromotive force battery 5.

The battery 5 may be of any well-known type, such as a plurality of sheets of metal partially immersed in a bath of electrolyte, and, inasmuch as the particular form of battery is immaterial to my present invention, no further description thereof is believed to be necessary.

The relay device 6 is adapted to assume the illustrated or upper position when energized as set forth in detail later, and the movable contact member 10 is adapted to bridge a pair of stationary contact members 11 when the relay device is deënergized and drops to its lower position, for a purpose to be described.

Since the particular main-circuit connections are, in general, irrelevant to the present invention, I have not deemed it necessary to illustrate switching devices for making the illustrated connections or for inaugurating regenerative operation, and any suitable system for accomplishing the intended main-circuit functions may be utilized.

Assuming that regenerative operation has been begun, with the various circuit connections established as illustrated, the main circuit is completed from the Trolley through conductor 15, where the circuit divides, one branch including conductor 16, main armature $A^1$, conductor 17, junction-point 18, main-circuit resistor $R^1$, a suitable switching device 19, which is here conventionally shown as an arrow-head, and conductor 20 to junction-point 21, and the other branch including conductors 22 and 23, main armature $A^2$, conductor 24, junction-point 25, main-circuit resistor $R^2$, switching device 26, which corresponds to the switching device 19, and conductor 27 to the junction-point 21, whence a common circuit is continued through conductors 28 and 29 to the negative supply-circuit conductor Ground.

The main field-winding circuit is established from one terminal 30 of the auxiliary exciting armature winding 3 through conductors 31 and 32 to the conductor 28 and the junction point 21, where the circuit divides, one branch including conductor 20, switching device 19, main-circuit resistor $R^1$, junction-point 18, main field winding $F^1$, and conductor 33 to a junction-point 34, and the other branch including conductor 37, switching device 26, main-circuit resistor $R^2$, junction-point 25, main field winding $F^2$ and conductor 35 to the junction-point 34, whence a common circuit is completed through conductor 36 to the other terminal 37 of the auxiliary generating armature winding 3.

An auxiliary circuit is completed from the positively energized conductor 22 through conductors 38 and 39, the auxiliary driving armature winding 2 of the dynamotor or motor-generator set, actuating coil 40 of the relay device 6 and conductors 41, 32 and 29 to the negative conductor Ground.

The shunt-excited field winding 8 for the auxiliary driving armature winding 2 has one of its terminals connected to the positively-energized conductor 38, while the other terminal thereof is connected through conductors 42 and 43, the coöperating stationary and movable contact members 9 and 10, respectively, of the relay device 6 in its upper position, the counter-electromotive force battery 5 and conductor 44 to the negatively-connected conductor 32. The counter-electromotive force battery 5 thus opposes the supply-circuit voltage to a predetermined degree to thus determine the normal excitation of the shunt field winding 8.

The above-mentioned negative compounding characteristic of the main regenerating machines may be briefly set forth as follows: Upon an incipient increase of main-circuit current by reason of a sudden decrease of supply-circuit voltage, for example, the resultant increased voltage drop across each of the main circuit resistors $R^1$ and $R^2$ immediately and inherently reduces the portion of the substantially constant voltage of the auxiliary generating armature 3 that is available for sending current through the main field windings $F^1$ and $F^2$, and thus the incipient main-circuit current increase tends to be checked. Such a system is more fully set forth in my above-identified copending application.

However although such action is sufficient to suitably compensate for ordinary supply-circuit voltage fluctuations, the regenerated voltage, under the emergency conditions of supply-circuit voltage interruption, is liable to rise to an undesirable value by reason of the decrease in the current flowing through the various portions of the system, as hereinbefore set forth.

In such circumstances, therefore, the voltages impressed upon the auxiliary driving armature 2 and the corresponding shunt-excited field winding 8 are somewhat increased, but, by reason of the opposing action of the series-related counter-electromotive force battery 5, it is evident that the voltage impressed upon the field winding 8 and the consequent current traversing it, will be increased in greater proportion than will the voltage and current of the armature winding 2. Such action is capable of mathematical demonstration but it is not believed that any such detailed explanation is necessary.

Since the increase of current in the field winding 8 is greater than the increase in the armature winding 2, it follows that the relatively strengthened field-winding excitation of the auxiliary shunt motor will cause a decreased speed thereof, in accordance with familiar principles. As a result, the speed and voltage of the auxiliary generating armature 3 will accordingly be reduced, to thus send a decreased current through the main field windings $F^1$ and $F^2$, whereby the voltages of the main momentum-driven armatures $A^1$ and $A^2$ are rapidly reduced to such a degree that the previously-mentioned "flash-over" difficulties are entirely avoided.

The function of the relay device 6 is to prevent any possibility of the energization of the shunt field winding 8 for the auxiliary driving motor, in the wrong direction, when starting the dynamotor or motor-generator set, whereby the reversed rotation thereof would be effected, such reversal of excitation being possible by reason of the connection of the counter-electromotive force battery 5 in circuit with the shunt field winding 8. By allowing the relay device 6 to occupy its lower position under starting conditions when a relatively light current traverses the actuating coil 40 of the relay device, the circuit of the shunt field winding is continued from the lower-voltage terminal thereof through conductors 42 and 45, the coöperating stationary and movable contact members 11 and 12, respectively, of the relay device 6 in its lower position, and conductor 46 to the negatively-energized conductor 44. Thus, the shunt field winding 8 is directly connected across the supply circuit, under starting conditions, and rotation of the auxiliary dynamotor or motor-generator set in the proper direction is insured.

Referring now to Fig. 2, the system shown comprises the various circuit connections that are shown in Fig. 1, and, in addition, there is provided a suitable line switch LS, a controller 50 for varying the main circuit resistors $R^1$ and $R^2$, an electrically-controlled, pneumatically-actuated operating mechanism 51 for the controller, a plurality of electrically-controlled switches 52 and 53 for connecting the auxiliary exciting armature 3 to the main field-winding circuit; a low-current relay device 54 and a limit switch 55 that are governed by the main-circuit current; and a similarly controlled time-limit relay device 56.

The controller 50 is preferably of the familiar drum type and embodies a plurality of contact members 60 and 61 of a suitable configuration for successively engaging a plurality of sets of control fingers 62 and 63, respectively, for gradually varying the active circuit values of the resistors $R^1$ and $R^2$. The operating mechanism 51 is of a familiar type that comprises a pinion 64, which is secured to the upper end of the operating shaft 65 of the controller 50 and is adapted to mesh with a horizontally movable rack member 66, to the opposite ends of which pistons 67 and 68 are secured to travel within appropriate operating cylinders 69 and 70. A pair of dissimilar valves 71 and 72 are associated with the outer ends of the respective cylinders 69 and 70 to admit fluid pressure thereto under predetermined conditions from any suitable source (not shown) through pipes or passages 73 and 74, respectively.

The valve member 71 is normally closed to prevent the admission of fluid pressure to the cylinder 69 and allows such admission only when its actuating coil "On" is energized. On the other hand, the valve member 72 is normally open to admit fluid-pressure to the cylinder 70 and the energization of its actuating coil "Off" cuts off such communication and permits the fluid pressure from the cylinder 70 to exhaust into the atmosphere. The pistons 67 and 68 are thus normally biased toward the valve member 71, as illustrated in the drawing.

The mechanical operation of the actuating mechanism 51 without regard to the electrical connections effected thereby may be set forth as follows: Upon simultaneous energization of the "On" and "Off" coils, fluid pressure is admitted to the cylinder 69 and is released from the other cylinder 70, whereby the resultant reversal of the initial unbalanced fluid-pressure conditions causes the piston to move toward the right from the illustrated position. To arrest such movement at any desired position of the controller 50, it is merely necessary to deënergize the "off" coil, thereby creating a state of balanced fluid pressures on the outer faces of the pistons 67 and 68 and effecting a positive and reliable stoppage of the mechanism. To return the controller to the illustrated position, the actuating coils "On" and "Off" are simultaneously deënergized, and the consequent reversion of fluid-pressure conditions to the original state accomplishes the desired result.

The low-current relay device 54 is provided with coöperating stationary and movable contact members 76 which remain in engagement when the relay device is held in its upper position, whereas the limit switch 55 is provided with similar contact members 77 that make contact only when the switch assumes its lower position.

The time-limit relay device 56 is constructed similarly to the low-current relay device 54, with the addition of a suitable time-limit apparatus, such as a dash-pot 78, for prolonging the time of opening of the circuit that is governed by the auxiliary contact members 79 of the device.

In tracing out the various circuit connections, only those which differ in some respect from the circuits illustrated in Fig. 1 will be discussed in detail. The main circuits of Fig. 2 comprise the armatures and the resistors $R^1$ and $R^2$, as previously set forth, as far as a point 80 intermediate the resistors in question, which point corsponds to the junction-point 21 of Fig. 1. The main circuit is completed therefrom through conductor 81, the actuating coils of the low-current relay device 54 and of the limit switch 55, conductor 82, the actuating coil of the time-limit relay device 56 and conductors 83 and 84 to the negative conductor Ground.

The main field-winding excitation circuit is completed from the positive terminal 30 of the auxiliary changing armature 3 through conductors 31 and 85, the switch 53, which is closed in a manner to be described, conductors 86, 87, 88 and 83, the actuating coils of the relay devices 56, 55 and 54 and conductor 81 to the junction-point 80, whence parallel circuits are completed, in a manner similar to that previously set forth, to the common field-winding junction-point 34 whence circuit is continued through conductor 89, closed switch 52 and conductor 90 to the negative terminal 37 of the auxiliary armature winding 3.

The auxiliary governing circuits for the switching devices 52 and 53 and the actuating coils of the operating mechanism 51 may be traced as follows: One circuit is established from the conductor 85, which is connected to the positive terminal of the auxiliary generating armature 3, through a suitable switching device 57, where the circuit divides, one branch including conductor 91, the actuating coil of the switch 53, conductors 92 and 93, auxiliary contact members 79 of the time-limit relay device 56 in its upper position, and conductor 94 to the negative terminal of the auxiliary generating armature 3. The other branch includes conductor 95, actuating coil of the switch 52 and conductor 96, to conductor 93, whence circuit is completed as just traced. In this way, the auxiliary generating armature is connected to the main field-winding circuits.

A further auxiliary circuit is completed from the positive terminal 30 of the auxiliary armature 3 through conductor 97, a suitable switching device 58, conductor 99, where the circuit divides, one branch including conductor 100, the actuating coil "On" of the operating mechanism 51, conductor 101, the auxiliary contact members of the time-limit relay device 56, and thence through conductor 94, to the opposite terminal of the auxiliary generator armature. The other branch in question includes the "off" actuating coil, conductor 102, auxiliary contact members 76 and 77 of the relay devices 54 and 55, respectively, and conductor 103 to the negatively-connected conductor 94.

The line switch energizing circuit is established from the positively-energized conductor 99 through conductor 104, the actuating coil of the switch LS and conductor 105, whence circuit is continued through the conductor 101, and the auxiliary contact members of the time-limit relay device 56, as previously traced.

It will be understood that the auxiliary control switches 57 and 58 may constitute suitable control fingers and contact members of a master controller, if desired, although, for the sake of simplicity and clearness, knife switches are illustrated.

The normal operation of the system during the regenerative period may be briefly set forth as follows: Since the "on" actuating coil of the operating mechanism 51 is permanently energized so long as the time-limit relay device 56 occupies the illustrated position, it follows that a forward movement of the controller 50 to short-circuit predetermined sections of the main-circuit resistors $R^1$ and $R^2$ occurs each time that the limit switch 55 drops to its lower position to complete the circuit of the "off" actuating coil, in accordance with the previously described operation of the mechanism 51. Thus, a step-by-step movement of the controller 50 to gradually exclude the resistors $R^1$ and $R^2$ from circuit, as the speed of the momentum-driven machines decreases, is obtained.

However, under the above-mentioned emergency conditions of an interruption of supply-circuit voltage, the previously described action of the counter-electromotive force battery 5 with respect to the auxiliary dynamo-electric machines occurs, whereby the resultant temporary decrease of regenerated current allows the low-current relay device 54 to drop to its lower position and thus interrupt the circuit of the "off" actuating coil. The controller 50 is thus maintained in whatever position it occupies, by reason of the consequent balanced-pressure conditions in the cylinders 69 and 70.

It will be understood that various other switches that are not here shown could be controlled in a similar manner by the action of the low-current relay device 54. For example, in case of the well-known "progression circuit" that is employed in automatic control systems, the previously closed switches would remain closed by reason of the prior formation of the familiar holding circuits, whereas, the closure of further switches would be prevented, in the same manner as by the limit switch 55, when the relay device 54 drops to its lower position. In brief, therefore, the function of the low-current relay device 54 is to maintain the circuit connections substantially unchanged during the first stages of supply-circuit voltage-interruption conditions.

However, in case of a supply-circuit voltage interruption of several seconds duration, the speed of the main and auxiliary machines and the field excitation thereof will in many cases decrease to such values that a sudden reconnection of the machines to the supply circuit would cause undesirable current surges or voltage peaks that might lead to "flash-over" difficulties, particularly in the auxiliary driving motor. To make provision for preventing such undesirable conditions, the time-limit relay device 56 is regulated to open the corresponding circuit after a period of several seconds, as may be desired. Thus, the circuits of the "on" actuating coil and of the actuating coils for the switches LS, 52 and 53 are interrupted to allow fluid pressure to escape from the cylinder 69 in the one case and to open up the supply-circuit connection and the excitation circuit of the auxiliary generating armature 3 in the other instance. Since the circuit of the "off" actuating coil is already opened by the low-current relay device 54, it follows that the operating mechanism 51 is returned toward the illustrated position, as well as the switches 52 and 53 being opened. Thus, the sudden resumption of supply-circuit voltage effects no harmful results, since various circuit connections are interrupted and the system remains inoperative until properly restored in any suitable manner.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of regenerative control, the combination with a main dynamo-electric machine having an armature and a field winding, and auxiliary dynamo-electric means comprising armature and field windings for exciting said main field-winding, of means comprising a counter-electromotive force battery in circuit with one of said windings for automatically varying the speed of said auxiliary means oppositely to variations of regenerated voltage.

2. In a system of regenerative control, the combination with a dynamo-electric machine having an armature and a field winding, of a plurality of auxiliary mechanically-connected armature windings respectively driven by the regenerated voltage and adapted to excite said field winding, and means for automatically varying the speed of the auxiliary armature windings oppositely to variations of regenerated voltage.

3. In a system of regenerative control, the combination with a main dynamo-electric machine having an armature and a field winding, of a plurality of auxiliary mechanically-connected armature windings respectively driven by the regenerated voltage and adapted to excite the main field winding, and means associated with the auxiliary machine to automatically vary their field-winding excitation, upon an increase of regenerated voltage, in such manner that a decrease of auxiliary machine speed obtains.

4. In a system of regenerative control, the combination with a main dynamo-electric machine having an armature and a field winding, of a plurality of auxiliary mechanically-connected armature windings respectively driven by the regenerated voltage and adapted to excite the main field windings, field windings for said auxiliary armature windings, and means associated with an auxiliary field-winding circuit for effecting a greater proportionate increase in its current upon an increase of supply-circuit voltage than occurs in the auxiliary driving armature winding, whereby the speed thereof is reduced to correspondingly decrease the main field-winding excitation.

5. In a system of regenerative control, the combination with a main dynamo-electric machine having an armature and a field winding, of a plurality of auxiliary mechanically-connected armature windings respectively driven by the regenerated voltage and adapted to excite the main field winding, and counter-electromotive means connected in a field-winding circuit of the auxiliary driving armature winding to cause different rates of change of auxiliary field-winding current and auxiliary armature-winding current under predetermined conditions.

6. In a system of regenerative control, the combination with a main dynamo-electric machine having an armature and a field winding, of a plurality of auxiliary mechanically-connected armature windings respectively driven by the regenerated voltage and adapted to excite the main field winding, and a counter-electromotive force battery connected in a field-winding circuit for one of the auxiliary armature windings.

7. In a system of regenerative control, the combination with a main dynamo-electric machine having an armature and a field winding, of a plurality of auxiliary mechanically-connected armature windings respectively driven by the regenerated voltage and adapted to excite the main field winding, a shunt-excited field winding for the auxiliary driving armature winding, and a counter-electromotive force battery connected in circuit with said shunt-excited field winding, whereby a sudden increase of regenerated voltage produces a greater rate of current increase in said shunt-excited field winding than in the auxiliary driving armature winding to thus decrease the speed and voltage of the auxiliary exciting armature winding.

8. In a system of regenerative control, the combination with a main dynamo-electric machine having an armature and a field winding, of a resistor connected in circuit with the main armature, a plurality of auxiliary mechanically-connected armature windings respectively driven by the regenerated voltage and adapted to excite the main field winding through said resistor, and means associated with the auxiliary machines to automatically vary their field-winding excitation, upon an increase of regenerated voltage, in such manner that a decrease of auxiliary machine speed obtains.

9. In a system of regenerative control, the combination with a main dynamo-electric machine having an armature and a field winding, of a resistor connected in circuit with the main armature, a plurality of auxiliary mechanically-connected armature windings respectively driven by the regenerated voltage and adapted to excite the main field winding through said resistor, and counter-electromotive means connected in a certain circuit of said auxiliary machines.

10. In a system of regenerative control, the combination with a main dynamo-electric machine having an armature and a field winding, of a resistor connected in circuit with the main armature, a plurality of auxiliary mechanically-connected armature windings respectively driven by the regenerated voltage and adapted to excite the main field winding through said resistor, a shunt-excited field winding for the auxiliary driving armature winding, and a counter-electromotive force battery connected in circuit with said shunt-excited field winding.

11. In a system of control, the combination with a dynamo-electric machine having an armature and a field winding, of a plurality of auxiliary mechanically-connected armature windings respectively driven by the regenerated voltage and adapted to excite said field winding, means for automatically varying the speed of the auxiliary armature windings oppositely to variations of regenerated voltage, and means for rendering said last means inoperative under predetermined conditions.

12. In a system of regenerative control, the combination with a main dynamo-electric machine having an armature and a field winding, of a plurality of auxiliary mechanically-connected armature windings respectively driven by the regenerated voltage and adapted to excite the main field winding, means associated with the auxiliary machines to automatically vary their field-winding excitation, upon an increase of regenerated voltage, in such manner that a decrease of auxiliary machine speed obtains, and means for automatically rendering said last means inoperative under starting conditions of the auxiliary machines.

13. In a system of regenerative control, the combination with a main dynamo-electric machine having an armature and a field winding, of a plurality of auxiliary mechanically-connected armature windings respectively driven by the regenerated voltage and adapted to excite the main field winding, and a counter-electromotive force battery connected in a field-winding circuit for one of the auxiliary armature windings, and means dependent upon auxiliary driving armature winding electrical conditions for maintaining said battery in circuit.

14. In a system of regenerative control, the combination with a main dynamo-electric machine having an armature and a field winding, of a plurality of auxiliary mechanically-connected armature windings respectively driven by the regenerated voltage and adapted to excite the main field winding, a shunt-excited field winding for the auxiliary driving armature winding, a counter-electromotive force battery connected in circuit with said shunt-excited field winding, whereby a sudden increase of regenerated voltage produces a greater rate of current increase in said shunt-excited field winding, than in the auxiliary driving armature winding to thus decrease the speed and voltage of the auxiliary exciting armature winding, under predetermined conditions, and a relay device adapted, when de-energized, to connect said shunt-excited field winding to receive the full main-machine voltage and, when energized, to connect said battery in circuit.

15. In a system of regenerative control, the combination with a main dynamo-electric machine having an armature and a field winding, of auxiliary exciting means for said field winding, means for normally varying such excitation, means for automatically effecting a decrease of main field-winding excitation upon an increase of regenerated voltage, and means for thereupon maintaining the system connections substantially unchanged for a predetermined period.

16. In a system of regenerative control, the combination with a main dynamo-electric machine having an armature and a field winding, of a plurality of auxiliary mechanically-connected armature windings respectively driven by the regenerated voltage and adapted to excite the main field winding, switching means for normally varying such excitation, means associated with the auxiliary machines for automatically effecting a decrease of main field-winding excitation upon an increase of regenerated voltage, and means for thereupon maintaining the system connections substantially unchanged for a predetermined period.

17. In a system of regenerative control, the combination with a main dynamo-electric machine having an armature and a field winding, of a plurality of auxiliary mechanically-connected armature windings respectively driven by the regenerated voltage and adapted to excite the main field winding, switching means for normally varying such excitation, means associated with the auxiliary machines, to automatically vary their field-winding excitation upon an increase of regenerated voltage, in such manner that a decrease of auxiliary machine speed obtains, and means for thereupon maintaining the system connections substantially unchanged for a predetermined period.

18. In a system of regenerative control, the combination with a main dynamo-electric machine having an armature and a field winding, of an auxiliary source of energy for exciting said field winding, a variable resistor in circuit with said auxiliary source, a controller for governing said resistor, means for automatically effecting a decrease of main field-winding excitation upon an increase of regenerated voltage, and means for thereupon maintaining said controller in the occupied position for a predetermined period.

19. In a system of regenerative control, the combination with a main dynamo-electric machine having an armature and a field winding, of a plurality of auxiliary mechanically-connected armature windings respectively driven by the regenerated voltage and adapted to excite the main field winding, a variable resistance in circuit with the exciting armature winding, a controller for governing said resistor, means associated with the auxiliary machines for automatically effecting a decrease of main-field-winding excitation upon an increase of regenerated voltage, and means for thereupon maintaining said controller in the occupied position for a predetermined period.

20. In a system of control, the combination with a supply circuit, and a dynamo-electric machine, of means for normally varying certain machine connections, and means for automatically preventing such variation, upon an interruption of supply-circuit energy, for a predetermined period.

21. In a system of control, the combination with a supply circuit, and a dynamo-electric machine, of means for normally varying certain machine connections, means for automatically preventing such variation, upon an interruption of supply-circuit voltage, for a predetermined period, and other automatic means for interrupting predetermined machine circuits at the end of said period.

22. In a system of control, the combination with a supply circuit, and a dynamo-electric machine, of automatic means for normally varying certain connections of the machine to regulate the operation thereof, relay means for automatically preventing such variation, upon an interruption of supply-circuit voltage, for a predetermined period, and other relay means for automatically interrupting predetermined machine circuits at the end of said period.

23. In a system of regenerative control, the combination with a dynamo-electric machine having an armature and a field winding and a motor-generator set for exciting said field winding, the motor-generator set comprising a generator and a motor having an armature and a field winding, of means for automatically varying the excitation of the motor field winding to vary the speed of the motor-generator set oppositely to variations of the regenerative voltage.

In testimony whereof, I have hereunto subscribed my name this 1st day of Sept., 1916.

RUDOLF E. HELLMUND.